United States Patent
Colterjohn et al.

[11] 3,739,699
[45] June 19, 1973

[54] PANORAMIC AERIAL CAMERA
[76] Inventors: Walter L. Colterjohn; Waldemar B. Karkow, Jr., both of 1201 Oak Ridge Circle, Barrington, Ill. 60010
[22] Filed: Jan. 5, 1972
[21] Appl. No.: 215,519

[52] U.S. Cl. ..................... 95/12.5, 95/15, 240/1.3, 350/181, 355/52
[51] Int. Cl. ........................................... G03b 37/02
[58] Field of Search ....................... 95/12.5, 15, 16, 95/17; 355/52, 55; 350/181, 182; 352/69; 240/1.3

[56] References Cited
UNITED STATES PATENTS

| | | |
|---|---|---|
| 3,364,830 | 1/1968 | Aschenbrenner et al............. 95/12.5 |
| 3,537,373 | 11/1970 | Land................................. 95/12.5 X |
| 1,136,761 | 4/1915 | Becker.................................... 95/15 |
| 2,551,753 | 5/1951 | McCullough ..................... 240/1.3 X |
| 3,625,122 | 12/1971 | Valdes................................ 95/12.5 |
| 2,955,518 | 10/1960 | Perry ............................... 352/69 X |

*Primary Examiner*—Robert P. Greiner

[57] ABSTRACT

A panoramic scanning camera adapted to scan a plurality of adjacent narrow transverse strips of the terrain being photographed. Changes of scale, which cause discontinuity between adjacent images, are compensated for by using an optical system which rectifies the image by varying the magnification thereof as a function of the angle between the optical axis and the nadir, viz. the scan angle.

6 Claims, 7 Drawing Figures

Patented June 19, 1973 3,739,699

Patented June 19, 1973

PANORAMIC AERIAL CAMERA

BACKGROUND AND SUMMARY OF THE INVENTION

This invention relates to aerial photographic camera systems, and more particularly to a day/night panoramic scanning camera system having a narrow field of view and means for combining adjacent images with a minimum of discontinuity.

Prior art panoramic cameras cover relatively large field angles in the direction transverse to the direction of scan. These angles are normally established by the ratio between the camera focal length and the photographic film width. Such cameras have proved highly suitable for daytime photography, providing very high angular acuity in combination with large lateral coverage. They are, however, very likely to exhibit rather poor performance capability in night time aerial reconnaissance. It is difficult in such a camera, for example, to incorporate an image intensifier without seriously degrading either acuity or coverage because of the poor contrast transfer characteristics of image tubes when required to operate over a large field at a high resolution. It is also difficult to provide very high speed lenses which will permit coverage of the relatively large field angles at high resolution.

A panoramic scanning camera having a limited longitudinal as well as lateral field of view substantially avoids these difficulties. A field angle of less than twenty milliradians is desirable. It is possible to effectively utilize an image intensifier tube if the field is limited to less than this size, which represents perhaps several hundred line pairs of maximum resolution required. An intensifier tube of small size can cover the whole field with the highest camera acuity requiring only very moderate tube resolving power. It is also possible in a small field scanning camera to provide very high speed optics of high resolving power.

An important requirement for a panoramic scanning camera of small longitudinal field of view is that it be capable of combining the recorded images of adjacent scans into an essentially unified larger recorded image. This is not to say that some demarcation between scans is not tolerable. The dicontinuity, however, should be minimized or the task of photo interpretation becomes intolerable.

To avoid serious discontinuity, it is necessary that the camera provide rectification of the image in the direction perpendicular to the direction of scan. In a panoramic aerial camera a scale change occurs which is proportional to the secant of the lateral angle from nadir, hereinafter referred to as the scan angle. This scale change must be avoided in the direction of flight or the image segments cannot be combined nor can discontinuity be avoided.

The camera systems of this invention utilize optical or electron-optical anamorphic rectifying means to accomplish the required magnification change in the longitudinal direction.

To minimize gross image distortions and to avoid discontinuity between the image segments, it will generally also be necessary to provide stabilization of the camera system against angular motions of the aircraft. This can be provided in roll or in roll, yaw and pitch as the circumstances require by suitable mounting with gimbles or otherwise and by the use of stabilizing sensors and drive means.

In order to permit night time operation, it is essential to provide an illuminator in the camera system. This illuminator, for efficient utilization, must be capable of concentrating its radiation into a field essentially as small as that of the camera's field of view, and it must scan in close synchronization with the camera. If this is done, one does not suffer a disadvantage from the short exposure time as this is offset by a corresponding increase in scene brightness due to the illuminator's concentration of flux into the region being viewed.

An important advantage is obtained by using a narrow angle illumination beam in combination with a narrow angle viewing field. Atmospheric backscatter of illumination into the viewing field is avoided to a very significant extent as is the resultant degradation.

The camera systems of this invention are essentially designed to provide a solution to the problem of obtaining high performance capability in night time aerial photographic reconnaissance. This is accomplished by providing means to obtain wide lateral coverage, high acuity and high sensitivity and by minimizing the effect of atmospheric backscatter. High performance day operation of the camera is possible also so that a combined day-night capability can be provided with these systems.

DETAILED DESCRIPTION OF A PREFERRED EMBODIMENT OF THE INVENTION

Figure 1:
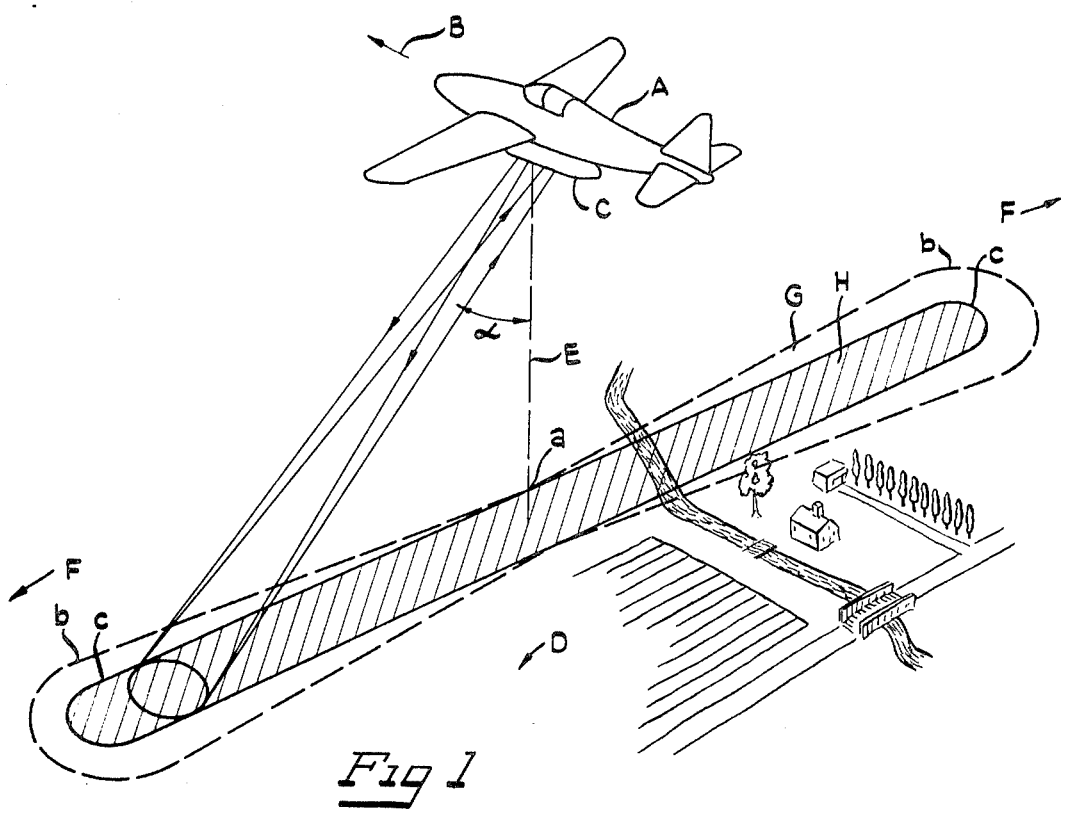
FIG. 1 is a pictorial representation of an aerial reconnaissance system of the type to which the invention pertains.
Figure 3:
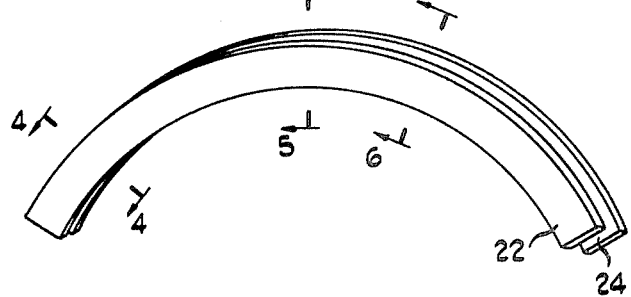
FIG. 3 is a perspective view of a variable anamorphic rectifying lens pair.

Referring now to FIG. 1, the aircraft A is shown pictorially as flying in a direction designated by arrow B. The aircraft carries an aerial camera/illuminator C, usually mounted under the fuselage, as shown, or under the wing.

While there are various modes of photographing the terrain D beneath the aircraft, the present invention deals with a system using a panoramic scan in a direction transverse (or at least substantially transverse) to the direction of flight.

In the conventional panoramic scanning camera, a certain amount of distortion is inherent because of the changes in scale as the scan angle changes, i.e., the optical axis moves from the nadir E toward the horizon F. It is obvious that the field of view enlarges as a function of the secant of the scan angle $\alpha$, such that objects appear relatively smaller at a point nearer the horizon than they do at the nadir, directly underneath the aircraft.

This phenomenon introduces serious problems if one wishes to combine adjacent scans with minimum discontinuity. It will be noted from the area G enclosed by the dotted lines in FIG. 1 that the shape of the field on each side of the aircraft approximates a trapezoid. It is, therefore, necessary to scan at such a rate that the triangular areas $a$, $b$, $c$ overlap in the next frame thus making a large portion of each image redundant. If the images are not overlapped, then large gaps appear in the center of the image, making interpretation very difficult.

On the other hand, if the successive images can be photographed with a minimum degree of overlap in narrow, parallel strips, the interpretive photograph can be constructed with relative ease. In the present invention, image rectification means are operatively associated with aerial camera C such that the field is reduced in the direction of flight as the scan angle increases, i.e., when the optical axis moves from the nadir toward the horizon. The object image is accordingly magnified in the direction of flight to avoid scale changes such that the field scanned is essentially the shaded area H shown in FIG. 1, said area having parallel edges. The scanning may then be synchronized so that there is a negligible amount of image overlap in successive frames.

Figure 2:
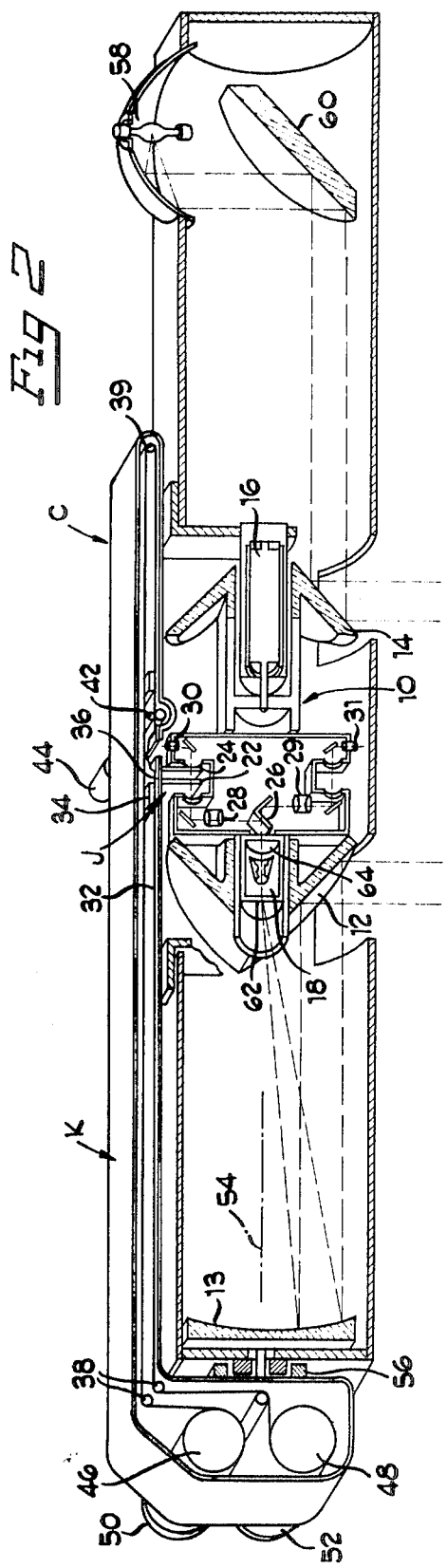
FIG. 2 is a perspective view, with portions broken away and shown in section, of a preferred embodiment of my panoramic camera incorporating an image intensifier tube.

FIG. 2 shows a camera/illuminator C utilizing an image intensifier and a stationary illuminator. A rotor 10 carries a pair of two facet diagonal mirrors 12 and 14 for scanning, respectively, the field of view of the camera and the illuminator beam. This rotor, driven by motor 16, operates continuously at a rate adequate to produce some overlap of adjacent scans. The intensifier tube 18 and the recording optics, not including the image rectification system J which comprises elements 22 and 24, are mounted in the rotor and move with it. Primary mirror 13 focuses the radiation reflected from diagonal mirror 12 onto the intensifier tube 18. Two channels of recording optics are used, one for each mirror facet. A beam splitter 26 divides the output of the image tube into these channels. Relay lenses 28 and 29 alternately form a virtual image between the stationary anamorphic rectifying lenses 22 and 24. The recording lenses 30 and 31 alternately project the image onto the recording film 32.

The recording film moves continuously in the longitudinal direction at a rate proportional to the image angular velocity in this direction.

In the region of the recording lens, the film 32 is constrained to an arc about the rotor's center of rotation, at a distance equal to the overall focal length of the camera, by curved elements 34 and 36. Adequate distance is provided between flat rollers 38 and 39 and the curved elements 34 and 36 to permit transition between the curved and flat sections. A metering drive roller 42 of adequately short length is provided close to the recording area to permit smooth drive of the film at the desired rate. The motor/tachometer 44 serves to actuate the metering roller and provide information on the drive rate for control purposes. The film takeup roll 46 and supply roll 48 are provided with constant force torque motors 50 and 52 to maintain constant film tension and cause required film take up.

The film assembly K and items mounted thereon, including the rectifying elements 22 and 24, are mounted with freedom to roll on the axis 54. This is done to permit this assembly to be inertially stabilized relative to roll motion of the aircraft. Torque motor 56 operating in conjunction with a rate damping gyro and position sensor (not shown) by means well known in the art of inertial stabilization accomplishes this stabilization. Yaw and pitch stabilization as required can be accomplished by means of suitable mounting of the camera/illuminator assembly as a whole and by the use of stabilizing sensors and drive means.

The stationary illuminator 58 projects its beam by means of the mirror 60 to the two facet diagonal mirror 14 of the rotor. Its beam is thereby caused to scan with the viewing field of the camera and to illuminate it as required.

The intensifier 18, as illustrated, is of the type which emits photoelectrons from a cathode 62, which photoelectrons, after being accelerated in an electric field, are focused upon a cathode ray luminescent phosphor screen 64. This intensifier may be a single or multiple stage tube as adequately satisfies the system requirements. The response time of the intensifier must be adequately short to prevent image blurring or contrast degradations at the operational speeds intended. Tubes utilizing P-16 phosphor (or possibly P-15, P-24, or P-37) are likely necessary. The gain of the tube and light output capability must be adequate to satisfy the radiometric requirements of the intended application.

Figure 4:
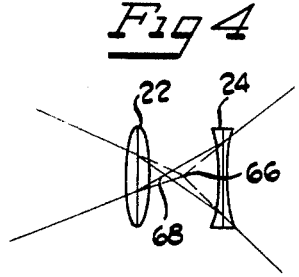
FIG. 4 is a cross-section view taken along the plane of line 4—4 of FIG. 3.
Figure 5:
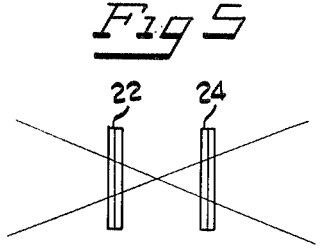
FIG. 5 is a cross-section view taken along the plane of line 5—5 of FIG. 3.
Figure 6:
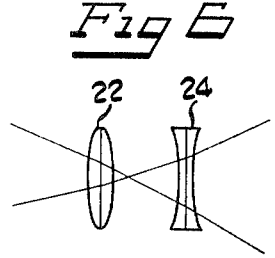
FIG. 6 is a cross-section view taken along the plane of line 6—6 of FIG. 3.

The image rectification system J, as previously noted, includes elements 22 and 24 to provide the necessary anamorphic rectification of the image. These elements are more clearly illustrated in FIGS. 3 to 6. Element 22 is an arcuately shaped, positive anamorphic lens whose power changes continuously along the length of the arc as shown in the section views of FIGS. 4 to 6. Element 24 is an arcuately shaped, negative anamorphic lens whose power likewise changes. The focal position 66 is advanced by lens 22 while lens 24 causes the virtual focal position to shift from 68 back to 66. The magnification of the lens elements 22 and 24 in combination is made proportional to the absolute value of the secant of the scan angle from nadir.

Figure 7:
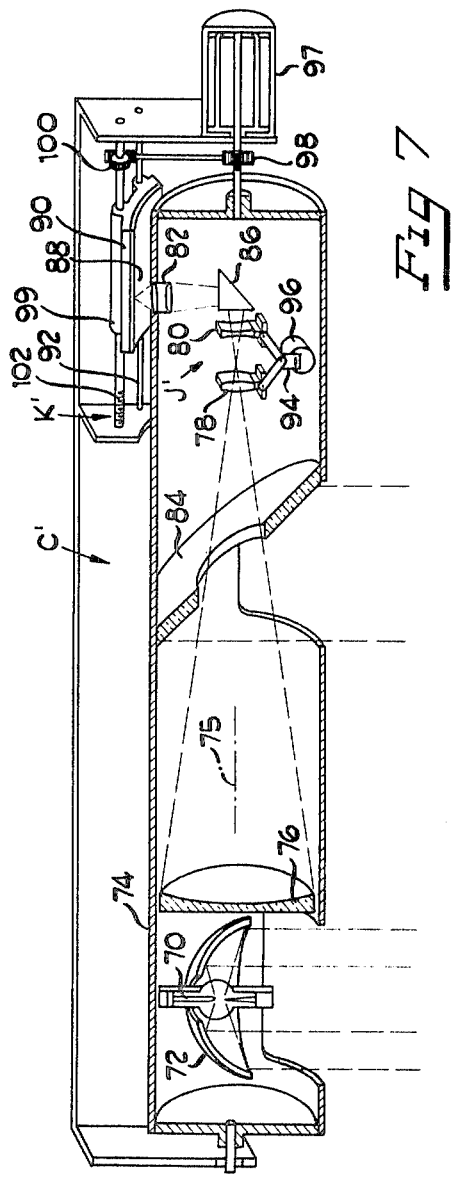
FIG. 7 is a perspective view, with portions broken away and shown in section, of a modified panoramic camera and illuminator system according to the invention.

A modified form of the invention is illustrated in FIG. 7. The camera/illuminator C' includes an illuminator consisting of a high intensity lamp 70, with a collimating reflector 72 mounted in a rotating tube 74. The camera comprises an objective mirror 76, image rectification means J' including anamorphic rectifying lenses 78 and 80, recording lens 82, flat mirror 84, and roof prism 86, also mounted in the rotating tube 74. Film carriage assembly K' includes film 88, and film platen 90 which does not rotate with the tube, but is free to move transversely on rod 92. The flat mirror 84 serves to direct the radiation from the scene to the objective mirror 76 which then directs it to the photographic film via the rectifying elements 78 and 80 and the lens 82. As the tube 74 rotates on axis 75, the field of view of the camera is scanned in a direction lateral to the axis of the tube. At the same time, the image is scanned across the film by virtue of the tube's rotation. If the effective focal length of the camera, as determined by the power of the mirror 76 and lens 82, is made equal to the distance of the film from the axis 75, the motion of the image is made exactly equal and opposite to that of the tube and the image is consequently stationary relative to the film as the camera scans.

The combined power of the rectifying lenses 78 and 80 is caused to vary as a function (secant) of the lateral scan angle. In this arrangement, this would be done by changing the separation of lenses 78 and 80. Means for effecting such variable separation may take the form of a cam 94 which is driven synchronously with tube 74 by means of motor 96. Motor 97, which drives tube 74, can also serve to advance the film 88 and film platen 90 at the proper rate by means of geared drive elements 98 and 100 and screw 102.

If the camera system C' is mounted in an aircraft A as shown in FIG. 1, with the axis of the rotating tube lying in the direction of the flight B, the camera will record successive lateral scans. If the film is advanced at a continuous rate equal to the longitudinal image motion rate, and the image is rectified in the longitudinal direction, the successive scans will combine without discontinuity along their full length into a single picture. It is the function of the cylindrical lenses 78 and 80 to cause a variable magnification in the longitudinal direction proportional to the secant of scan angle from nadir, while not causing the focal position to change or causing any appreciable rectification along the direction of scan. If the image were rectified along the direction of scan, it would be necessary to change the effective scan rate in this direction. Doing this would considerably complicate the design of a wide angle high speed system.

While this invention has been described in connection with certain specific embodiments thereof, it is to be understood that this is by way of illustration and not by way of limitation, and the scope of the appended claims should be construed as broadly as the prior art will permit.

What is claimed is:

1. In a panoramic aerial camera of the type adapted to be carried in flight over the terrain to be photographed, and including scanning means for sequentially photographing a plurality of narrow strips extending substantially transverse to the direction of flight, the improvement comprising anamorphic image rectification means for controlling the magnification of the image only in the direction normal to the direction of scan as a function of the scan angle to provide a constant scale between object and image in the direction normal to the direction of scan.

2. Apparatus as defined in claim 1 including an illuminator adapted to scan said terrain in synchronization with said camera.

3. Apparatus as defined in claim 1 wherein the magnification of the image is varied in direct proportion to the secant of said scan angle.

4. Apparatus as defined in claim 1 wherein said image rectification means includes an arcuate anamorphic lens, the magnification power of which varies continuously from the center of the arc, corresponding to images photographed at the nadir, to the distal portions thereof, corresponding to images photographed at the horizon.

5. Apparatus as defined in claim 1 wherein said image rectification means comprises a pair of spaced lenses positioned along the optical axis of said camera and means for varying the distance between said lenses as a function of said scan angle, said lenses effecting increased magnification of said image as said scan angle increases.

6. Apparatus as defined in claim 1 including an image tube capable of intensifying the camera image received by it, and optical means for relaying the image tube output image to the recording film.

* * * * *